United States Patent [19]

Miyake et al.

[11] Patent Number: 5,082,728
[45] Date of Patent: Jan. 21, 1992

[54] MAGNETIC DISC

[75] Inventors: Akira Miyake, Osaka; Norio Akai, Ibaraki; Tomizo Taniguchi, Kyoto, all of Japan

[73] Assignee: Hitachi Maxell, Ltd., Osaka, Japan

[21] Appl. No.: 586,395

[22] Filed: Sep. 20, 1990

Related U.S. Application Data

[63] Continuation of Ser. No. 310,284, Feb. 14, 1989, abandoned.

[30] Foreign Application Priority Data

Feb. 17, 1988 [JP] Japan ................................. 63-34709

[51] Int. Cl.$^5$ .............................................. G11B 23/00
[52] U.S. Cl. .................................... 428/329; 427/131; 428/694; 428/900
[58] Field of Search ....................... 428/329, 694, 900; 427/131; 360/135

[56] References Cited

U.S. PATENT DOCUMENTS

| | | | |
|---|---|---|---|
| 4,547,419 | 10/1985 | Nishimatsu et al. | 428/694 |
| 4,639,389 | 1/1987 | Nishimatsu et al. | 428/694 |
| 4,741,954 | 5/1988 | Ide et al. | 428/329 |
| 4,788,092 | 11/1988 | Chubachi et al. | 428/329 |

Primary Examiner—Paul J. Thibodeau
Attorney, Agent, or Firm—Birch, Stewart, Kolasch & Birch

[57] ABSTRACT

A magnetic disc with good abrasion resistance and improved durability, which comprises a non-magnetic substrate, a magnetic layer comprising a metal magnetic powder formed on one side of the substrate and a coating comprising an inorganic powder having a Mohs hardness of not less than 4 formed on the other, back side of the substrate, which has good abrasion resistance and improved durability.

3 Claims, No Drawings

MAGNETIC DISC

This application is a continuation, of application Ser. No. 07/310,284 filed on Feb. 14, 1989 which was a now abandoned.

BACKGROUND OF THE INVENTION

1. Field of the Invention

The present invention relates to a magnetic disc with improved durability.

2. Description of the Related Art

Naturally, magnetic layers are formed on both sides of a double sided magnetic disc. Further, in the case of a single sided magnetic disc, in general, the magnetic layer is formed not only the recording side but also on the opposite site side which does not serve for recording in order to prevent deformation of the disc such as by curling. In the case of a recently developed single sided video floppy disc with a high recording density which disc uses metal magnetic powder, both sides of the disc substrate are coated with a magnetic layer containing the metal magnetic powder. However, the magnetic layer containing the metal magnetic powder has a large coefficient of friction and poor abrasion resistance. Thus, it is desirable to solve these problems of the magnetic layer containing the metal magnetic powder.

SUMMARY OF THE INVENTION

An object of the present invention is to provide a magnetic disc with improved durability, which can solve the problems such as poor abrasion resistance of the conventional magnetic disc with the high recording density.

This and other objects are accomplished by a magnetic disc of the present invention which comprises a non-magnetic substrate, a magnetic layer comprising a metal magnetic powder formed on one side of the substrate and a coating comprising an inorganic powder having a Mohs hardness of not less than 4 formed on the other side of the substrate.

DETAILED DESCRIPTION OF THE INVENTION

During recording and reproducing, the non-recording side is slidingly pressed with a pad so as to maintain good contact of the recording side with a magnetic head. By supplying a coating comprising the inorganic powder with a large Mohs hardness, on the non-recording side of the disc, the coating has increased-abrasion resistance and is then less damaged by sliding contact with the pad. Accordingly, the overall running torque is decreased, the non-recording side having such a coating is less flawed and both sides are less damaged due to running use.

Among the inorganic powders with the Mohs hardness of not less than 4, those having the Mohs hardness of from 4 to 7 are preferred. Examples of the inorganic powder with such a large Mohs hardness are $\alpha$-$Al_2O_3$ (Mohs hardness of 9), SiC (9), $Cr_2O_3$ (9), $CrO_2$ (8), $TiO_2$ (6), $\alpha$-$Fe_2O_3$ (6), $\gamma$-$Fe_2O_3$ (6), cobalt containing $Fe_2O_3$ (6), and the like. These powders may be used independently or as a mixture of two or more of them. Preferably, the inorganic powder has an average particle size of from 0.1 to 2 $\mu$m. More preferably, the average particle size of the inorganic powder is substantially the same as that of the magnetic powder present in the magnetic layer.

The amount of the inorganic powder to be contained in the coating is from 5 to 60% by volume, preferably from 10 to 45% by volume based on the volume of the coating.

In addition to the inorganic powder, a coating composition to be coated on the non-magnetic side contains a binder resin (e.g. vinyl chloride-vinyl acetate copolymers, acrylate-vinyl chloride copolymers, polyvinyl butyral, nitrocellulose, phenoxy resins, polyurethane resins, polyester resins, etc.), a solvent (e.g. methyl ethyl ketone, methyl isobutyl ketone, cyclohexanone, tetrahydrofuran, toluene etc.) and other optional components (e.g. lubricants, antistatic agents, electrically conductive materials, etc.).

The ratio of the inorganic powder to the binder resin is from 90:10 to 50:50, preferably from 85:15 to 60:40 by weight.

The coating composition is coated on the non-recording side of the substrate by gravure coating, reverse coating, or spin coating. Then, the coated composition is dried by a heater or a fan.

The coating after drying has a thickness of from 0.5 to 10 $\mu$m, preferably 1 to 6 $\mu$m.

The magnetic layer may be formed in the same way as for the production of the conventional magnetic disc having a recording layer containing the metal magnetic powder.

Examples of the metal magnetic powder are generally acicular particles with a length of from 0.1 to 0.4 $\mu$m which substantially comprises iron and optionally contains Co, Ni, Cr, Zn, Al, Si, etc.

The magnetic layer is formed by coating the magnetic paint which contains the magnetic powder and resinous binder and other additives according to conventional methods.

PREFERRED EMBODIMENTS OF THE INVENTION

The magnetic layers formed on the recording side of the magnetic discs produced in the following Examples and Comparative Example were all formed as follows:

The below described components were kneaded and dispersed for 72 hours in a ball mill:

| Component | Parts by weight |
| --- | --- |
| Metal magnetic powder ($S_{BET}$: 50 m$^2$/g, H$_c$: 1,500 Oe) | 100 |
| Vinyl chloride-vinyl acetate-vinyl alcohol copolymer | 11 |
| Polyurethane resin | 6.6 |
| $\alpha$-$Al_2O_3$ powder | 15 |
| Isoamyl stearate | 10 |
| Toluene | 140 |
| Cyclohexanone | 140 |

Then, an isocyanate compound (4.4 parts by weight) was added and the mixture was further kneaded for 1 hour to obtain a magnetic paint. The paint was coated on one side of a non-magnetic substrate made of a polyethylene terephthalate film with a thickness of 33 $\mu$m and dried to form a magnetic layer with a dry thickness of 4.0 $\mu$m.

Then, a back coating paint described in each Example was coated on the other side of the substrate to a predetermined thickness and calendered. The substrate having the magnetic coating on one side and the back coating containing the inorganic powder on the other side was blanked to produce a magnetic disc of 47 mm in diameter.

EXAMPLE 1

The following components for the back coating were kneaded and dispersed for 72 hours in a ball mill:

| Component | Parts by weight |
|---|---|
| Co-cont. $\gamma$-$Fe_2O_3$ ($S_{BET}$: 20 $m^2$/g, $H_c$: 6,500 Oe) | 100 |
| Nitrocellulose | 15.6 |
| Polyurethane resin | 15.6 |
| $\alpha$-$Al_2O_3$ | 10 |
| Carbon black | 15 |
| Oleyl oleate | 7 |
| Toluene | 140 |
| Cyclohexanone | 140 |

Then, an isocyanate compound (7.8 parts by weight) was added and the mixture was further kneaded for 1 hour to obtain a back coating paint, which was coated on the other side of the substrate as described above.

EXAMPLE 2

In the same manner as in Example 1 but using $\gamma$-$Fe_2O_3$ in place of Co-containing $\gamma$-$Fe_2O_3$, the back coating paint was prepared.

EXAMPLE 3

In the same manner as in Example 1 but using $\alpha$-$Fe_2O_3$ in place of Co-containing $\gamma$-$Fe_2O_3$, the back coating paint was prepared.

EXAMPLE 4

In the same manner as in Example 1 but using a $Al_2O_3$ in place of Co-containing $\gamma$-$Fe_2O_3$, the back coating paint was prepared.

COMPARATIVE EXAMPLE

By using the above described magnetic paint as a back coating paint, a magnetic disc was produced.

The running torque and the flaws on the back coating after use were measured and observed on each magnetic disc produced in the Examples and the Comparative Example.

The running torque is measured by incorporating the magnetic disc in a jacket and running the disc on a disc drive. The torque is recorded after running the disc for one hour.

The flaws on the back coating after use were observed after running the magnetic disc on the disc drive for 24 hours and evaluated by following criteria:
A: No flaws observed.
B: Very thin running flaws observed.
C: Flaws observed.

The results are shown in Table.

TABLE

| Example No. | Back coating Inorganic powder | Thickness ($\mu$m) | Running torque (g-cm) | Flaws |
|---|---|---|---|---|
| 1 | Co-cont. $\gamma$-$Fe_2O_3$ | 3.0 | 0.20 | A |
| 2 | $\gamma$-$Fe_2O_3$ | 3.0 | 0.19 | A |
| 3 | $\alpha$-$Fe_2O_3$ | 3.0 | 0.20 | A |
| 4 | $\alpha$-$Al_2O_3$ | 3.0 | 0.22 | B |
| Comp. | Metal magnetic powder | 4.0 | 0.26 | C |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A magnetic disc which comprises:
    a non-magnetic substrate,
    a magnetic layer comprising a metal magnetic powder disposed in a resinous binder formed on one side of said substrate and
    a back coating formed on the other, opposite side of said substrate, said coating comprising a binder resin having dispersed therein an inorganic powder having a Mohs hardness of not less than 4 selected from at least one member of the group consisting of $\gamma$-$Fe_2O_3$ and cobalt-containing $\gamma$-$Fe_2O_3$, which powder has an average particle size of at least 0.1 micron and is contained in an amount of at least 5% by volume based on the volume of the coating.

2. The magnetic disc according to claim 1, wherein said inorganic powder is $\gamma$-$Fe_2O_3$.

3. The magnetic disc according to claim 1, wherein the average particle size of said inorganic powder is substantially the same as that of said metal magnetic powder.

* * * * *